(12) United States Patent
Bertsch et al.

(10) Patent No.: US 9,714,851 B2
(45) Date of Patent: Jul. 25, 2017

(54) DETECTION DEVICE AND METHOD FOR PRODUCING A DETECTION DEVICE

(71) Applicant: Robert Bosch GmbH, Stuttgart (DE)

(72) Inventors: Benjamin Bertsch, Lichentstein (DE); Wolfgang Woernle, Neustetten (DE); Roland Seitz, Nehren (DE); Michel Walz, Eningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/758,442

(22) PCT Filed: Dec. 19, 2013

(86) PCT No.: PCT/EP2013/077497
§ 371 (c)(1),
(2) Date: Jun. 29, 2015

(87) PCT Pub. No.: WO2014/102147
PCT Pub. Date: Jul. 3, 2014

(65) Prior Publication Data
US 2016/0195413 A1    Jul. 7, 2016

(30) Foreign Application Priority Data

| Dec. 27, 2012 | (DE) | 10 2012 224 383 |
| Jan. 17, 2013 | (DE) | 10 2013 200 633 |
| May 8, 2013 | (DE) | 10 2013 208 545 |

(51) Int. Cl.
*G01L 9/06*    (2006.01)
*G01D 11/24*    (2006.01)
*B29D 99/00*    (2010.01)

(52) U.S. Cl.
CPC ......... *G01D 11/245* (2013.01); *B29D 99/006* (2013.01)

(58) Field of Classification Search
CPC .......... G01D 11/24; G01D 11/245; G01L 9/06
(Continued)

(56) References Cited

U.S. PATENT DOCUMENTS

| 4,399,707 A | 8/1983 | Wamstad |
| 4,513,623 A | 4/1985 | Kurtz et al. |

FOREIGN PATENT DOCUMENTS

| CN | 101553719 A | 10/2009 |
| CN | 102084222 A | 6/2011 |

(Continued)

OTHER PUBLICATIONS

International Search Report for Application No. PCT/EP2013/077497 dated Jun. 2, 2014 (English Translation, 2 pages).

*Primary Examiner* — Lisa Caputo
*Assistant Examiner* — Jamel Williams
(74) *Attorney, Agent, or Firm* — Michael Best & Friedrich LLP

(57) ABSTRACT

The invention relates to a detection device for detecting a property of a medium, comprising at least one detection sensor, wherein the detection sensor is arranged in a housing, the housing comprising a housing cover. The housing cover is a one-piece molded part, and a compensation element is arranged on or in the housing cover which forms at least one inlet channel with an inlet port for the medium. The inlet channel has a first portion and a second portion, wherein the first portion and the second portion are arranged at an angle different from zero to each other and a closure means closes the first portion of the inlet channel.

14 Claims, 3 Drawing Sheets

(58) Field of Classification Search
USPC .................................................. 73/431, 721
See application file for complete search history.

(56) References Cited

FOREIGN PATENT DOCUMENTS

| | | | |
|---|---|---|---|
| DE | 10127485 | 12/2002 | |
| DE | 10127485 A1 * | 12/2002 | ......... H01R 13/5227 |
| DE | 102006040665 | 3/2007 | |
| DE | 102006040665 A1 * | 3/2007 | ......... B60R 21/0136 |
| JP | S5880542 U | 5/1983 | |
| JP | S6015648 U | 2/1985 | |
| JP | H10153511 A | 6/1998 | |
| JP | H11241970 A | 9/1999 | |
| JP | 2007114001 A | 5/2007 | |
| JP | 2007222490 A | 9/2007 | |
| WO | 9307457 | 4/1993 | |
| WO | WO 9307457 A1 * | 4/1993 | ......... G01L 19/0038 |

\* cited by examiner

DETECTION DEVICE AND METHOD FOR PRODUCING A DETECTION DEVICE

BACKGROUND OF THE INVENTION

The present invention relates to a detection device and to a method for producing such a detection device.

Detection devices for detecting a property of a medium are known from the prior art.

Such detection devices typically have a detection sensor, wherein the detection sensor is arranged in a housing of the detection device. Such a housing is typically composed of plastic, wherein it is fabricated by means of an injection molding method. In addition, such a housing has a housing cover, which is typically also fabricated from plastic as a one-piece molded part by means of an injection molding method.

The housing cover is then attached to the housing in an assembly step of the detection device together with a seal, for example an injection-molded-on silicone seal, and the seal protects the detection sensor against disruptive extraneous influences.

In order to position the medium whose properties are to be detected against the detection sensor of the detection device, an inlet opening is typically made in the housing cover. Within the scope of the present invention, the housing cover forms, instead of an inlet opening, an inlet duct with an inlet port, via which the detection device can be connected to the medium. Such an inlet duct with an inlet port is interesting when, for example, properties of a medium in a volume, such as for example in a hose, which is for example fabricated from silicone and is configured to detect impacts of pedestrians on a vehicle are to be detected.

In order to avoid falsifying the detection of the properties of the medium, a compensation element is arranged on the detection device, typically on the housing cover. The compensation element is configured in such a way that it has a defined compensation rate. The compensation rate must be selected such that changes in the properties of the medium are detected in a range which is relevant for the subsequent applications, but other changes are compensated. This typically means during the detection of impacts that rapid increases in pressure owing to impacts must continue to be detectable, while slow changes in pressure owing to changes in temperature or altitude have to be compensated. For this purpose, the compensation element is mounted on or at an opening in the detection device, for example on the housing cover, which opening comes to be significantly smaller than the inlet opening which is provided, or in the present case smaller than the opening which the inlet duct with the inlet port has.

Hitherto, the compensation opening which is necessary for the compensation could either be formed with a correspondingly configured shaping tool, in a step with the formation of the inlet duct, or with a separate shaping tool in an opposite way to the shaping tool. In this context, for example for the inlet duct a duct diameter of 4 mm was selected, and for the compensation opening an opening diameter of 0.8 mm. A compensation element, for example a pressure compensation element which can be bonded in, could be bonded onto the compensation element in a further method step. By configuring the inlet duct in such a way that a first section of the inlet duct and a second section of the inlet duct are arranged at an angle different from zero to each other, it is no longer possible to demold the inlet duct with the previous fabrication method. A bonded-in pressure compensation element with a relatively large diameter in order to implement the demolding is, however, not expedient, since the air throughput rate would become too large and the pressure signal would be falsified.

SUMMARY OF THE INVENTION

Mounting a detection device in a vehicle in an optimum way makes stringent requirements on the geometric properties of the detection device. These stringent requirements result in complex manufacturing methods. In order to be able to implement the manufacturing methods efficiently and cost-effectively, adaptations to the detection device are indispensible.

The detection device according to the invention for detecting a property of a medium has the following features; at least one detection sensor, wherein the detection sensor is arranged in a housing, wherein the housing has a housing cover, wherein the housing cover is a one-piece molded part, and a compensation element is arranged on or in the housing cover, and the housing cover forms at least one inlet duct with an inlet port for the medium, wherein the inlet duct has a first section and a second section, wherein the first section and the second section are arranged at an angle different from zero to each other, and a closure means closes the first section of the inlet duct.

The inventive configuration of the housing cover of the detection device makes it possible to configure the inlet port on the housing cover by means of a demolding tool in an injection molding method as a one-piece molded part. The opening which is necessary for the demolding is closed by a closure means. As a result, the function of the detection device is retained in an unchanged form despite an inlet duct with a first section and a second section, wherein the sections are arranged at an angle different from zero, in particular at an angle of 90°, to each other, and an efficient fabrication process can be ensured.

A closure means can be understood here to be a material such as, for example, a silicone connection or an element such as, for example, a stopper.

If an element is used as the closure means, the opening which is necessary for the demolding can be closed, after the demolding step, by pressing in, welding in (for example ultrasonic welding, laser welding) or bonding in the closure element, and the inlet duct is therefore defined again and closed without an additional sealing measure.

In one advantageous refinement of the detection device, the first section of the inlet duct has a compensation opening and a constant or a widening cross-sectional area in its longitudinal extent in the direction toward the compensation opening.

As a result of this configuration of the first section of the inlet duct it is ensured that the inlet duct can be embodied completely as a one-piece molded part by means of a demolding tool in a step of the injection molding method. As a result, an efficient fabrication process can be ensured.

In one advantageous refinement of the detection device, the closure means is a closure element, and the compensation element is arranged in or on the closure element.

In order to implement the demolding of the inlet duct with a first section and a second section, wherein the two sections are arranged at an angle different from zero to each other, in this advantageous refinement the bonded-in compensation element which has been used hitherto can be previously enclosed by injection molding, and the compensation element which has previously been enclosed by injection molding can be used as a closure element. As a result of the structural dimensioning of the previous enclosure of the compensation element by injection molding, the opening in the inlet duct can then be made larger, and the complete first section of the inlet duct can be demolded via the side at which or in which the compensation element is provided.

A compensation element which has been previously enclosed by injection molding can be acquired as a bought-in part or fabricated within the scope of the fabrication method.

As a result, the function of the detection device is retained in an unchanged form despite an inlet duct with an inlet port with a first section and a second section, wherein the two sections are arranged at an angle different from zero, in particular at an angle of 90°, to each other, and an efficient fabrication process can be ensured.

In one advantageous refinement of the detection device, the medium is a fluid, in particular a gas, and the first section of the inlet duct communicates essentially with a first volume, and the second section of the inlet duct communicates essentially with a second volume, and the compensation element essentially compensates the properties, to be measured, of the fluid in the first volume and the corresponding properties of the fluid in the second volume.

In one refinement of the detection device, the property, to be measured, of the fluid is a pressure or a change in pressure and/or a volume or a change in volume or a temperature or a change in temperature or a mass or a change in mass of the fluid.

In one refinement of the detection device, the compensation element is a pressure compensation element and causes the distribution of the fluid in the first volume and in the second volume to be essentially the same.

The compensation of the properties of the medium ensures that disruptive extraneous influences do not falsify the properties which are to be detected. If, for example, a pressure owing to an impact is to be detected, but the pressure increases owing to a change in temperature or altitude in the first volume, the compensation element ensures that the pressure in the first volume continues to correspond approximately to the pressure in the second volume. However, the compensation by means of the compensation element takes place so slowly that a rapid increase in pressure, caused, for example, by an impact, can continue to be detected.

The production method according to the invention for a detection device according to the present invention has the features that the first section of the inlet duct and the second section of the inlet duct are embodied as part of a one-piece molded part, and that the first section is closed with a closure means.

Since the first section of the inlet duct is closed with a closure means, it is possible to form the inlet duct on the housing cover as a one-piece molded part by means of a demolding tool in an injection molding method. The opening which is necessary for the demolding is closed by a closure means. As a result, the function of the detection device is retained in an unchanged form despite an inlet duct with a first section and a second section, wherein the sections are arranged at an angle different from zero, in particular at an angle of 90°, to each other, and an efficient fabrication process can be ensured.

In one advantageous refinement of the production method, the first section of the inlet duct has a compensation opening, and the cross-sectional area of the first section is formed so as to be constant or so as to widen in the longitudinal extent of the first section in the direction of the compensation opening.

In one advantageous refinement of the production method, the closure means is a closure element, and the compensation element is arranged in or on the closure element.

Previously it was necessary to demold the inlet port with a first demolding tool and to demold the compensation opening with a second demolding tool, which brings about a smaller opening. The smaller opening was then closed with a closure means, for example a compensation element, as a closure means, was bonded onto the smaller opening. Now it is possible to demold the complete inlet duct through the opening which is necessary in any case for the compensation element. The larger opening which is necessary for demolding the entire inlet duct is then closed by the closure element in which the compensation element is arranged. The production method can therefore be configured efficiently, and a separate demolding tool for forming the compensation opening can be dispensed with.

In one advantageous refinement of the production method, the closure element for closing the compensation opening of the first section is pressed in or welded in, for example by means of ultrasonic welding or laser welding, or bonded in.

As a result of the closure of the compensation opening of the first section with the closure element, no further sealing measures are necessary for the inlet duct. This configuration therefore likewise constitutes an efficient variant of the production method.

BRIEF DESCRIPTION OF THE DRAWINGS

The invention will be explained in more detail below by way of example with reference to the appended drawings, in which.

In the following description of preferred exemplary embodiments of the present invention, identical or similar reference symbols are used for the elements which act similarly and are illustrated in the various figures, wherein a repeated description of these elements is not given.

DETAILED DESCRIPTION

Figure 1:
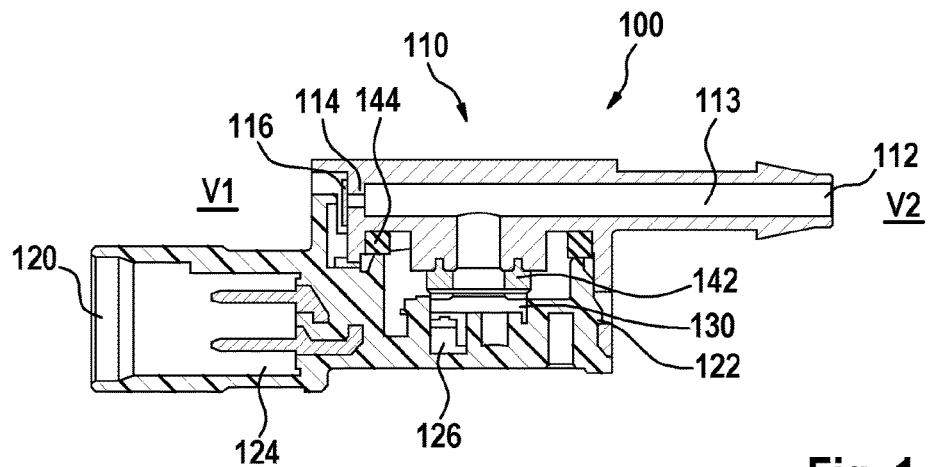
FIG. 1 shows a side view of a section through a detection device according to the prior art.

FIG. 1 shows a side view of a section through a detection device 100 according to the prior art. The detection device 100 has a housing cover 110 and a detection sensor 130 in a housing 120. The housing cover 110 forms an inlet duct 113 with an inlet port 112, which is configured in such a way that a volume V2, for example a silicone hose for detecting an impact, can be attached to the inlet port. The housing cover 110 also has a compensation opening 114 which is closed by a closure element 116 in the form of a bonded-on compensation element. The housing 120 has a plug 124 with a plug contact-forming means 126 and holding elements 122 in the form of clip arrangements.

The housing 120 and the housing cover 110 are fabricated as one-piece molded parts using an injection molding method.

In an assembly method, the detection sensor 130 is arranged in the housing 120, and the housing cover 110 is attached to the housing 120 by means of the holding elements 122. In this context, a sealing means 142 is attached to the housing cover 110 in such a way that during the assembly process the detection sensor 130 is connected to the plug contact-forming means 126 and is at the same time sealed against disruptive influences. Furthermore, the housing cover 110 has further sealing means 144 which additionally seal the interior of the detection device 100 against disruptive influences.

Figure 2:
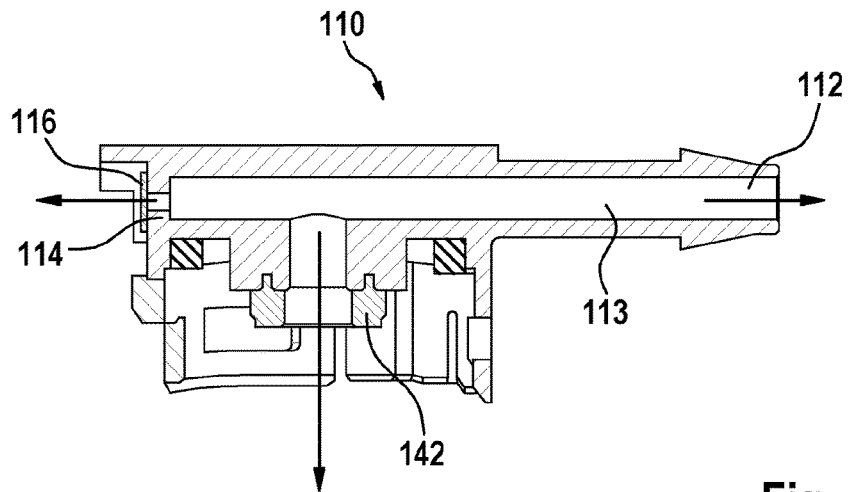
FIG. 2 shows a side view through a section through a housing cover of a detection device according to the prior art.

FIG. 2 shows a side view of a section through a housing cover 110 of a detection device 100 according to the prior art. The arrows indicate moving-out directions for demolding tools which are positioned in the mold before the injection molding, and are pulled out of the workpiece after the injection process in order to demold the sections. In this way, the inlet duct 113 and the compensation opening 114 are formed. Owing to the method, the cross-sectional areas of the sections to be demolded must be constant or must widen in the moving-out direction of the demolding tools. Otherwise, it would no longer be possible to remove the demolding tool from the workpiece after the injection process.

Figure 3:
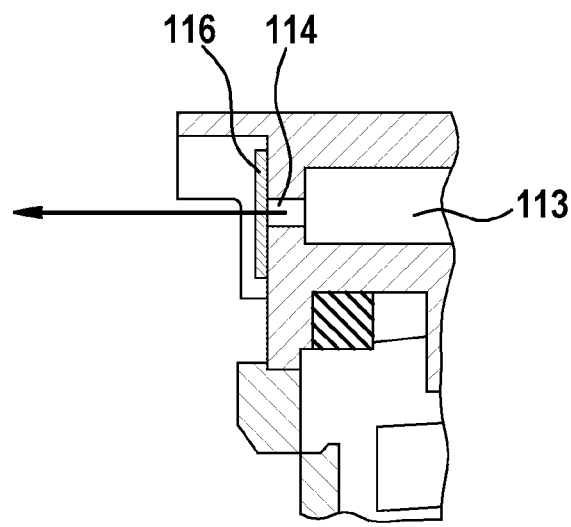
FIG. 3 shows a view of a detail of a side view of a section through a housing cover of a detection device according to the prior art.

FIG. 3 shows a view of a detail of a side view of a section through a housing cover 110 of a detection device 100 according to the prior art. In FIG. 3 it is clearly apparent that the cross-sectional area of the compensation opening 114 comes to be significantly smaller than the cross-sectional area of the inlet duct 113. This is necessary in order to regulate the throughflow rate through the compensation element 116. The throughflow rate of the compensation element 116 determines the speed with which the medium in the inlet duct 113 or in the connected volume V2 is compensated with the medium in the surroundings around the sensor V1. In this context it is to be noted that the compensation takes place so quickly that the detected values are not falsified. If, for example, changes in pressure owing to an impact are to be measured, compensation cannot take place so quickly that a change in pressure owing to an impact is compensated immediately by the compensation element. In contrast, changes in pressure which take place, for example, owing to changes in temperature or altitude, are to be compensated as uniformly and promptly as possible. In this context, the matching of the cross-sectional areas of the inlet duct 113 and of the compensation opening 114 plays a decisive role. In the cited example, the diameter of the inlet duct 113 is 4 mm, and the diameter of the compensation opening is 0.8 mm.

Figure 4:
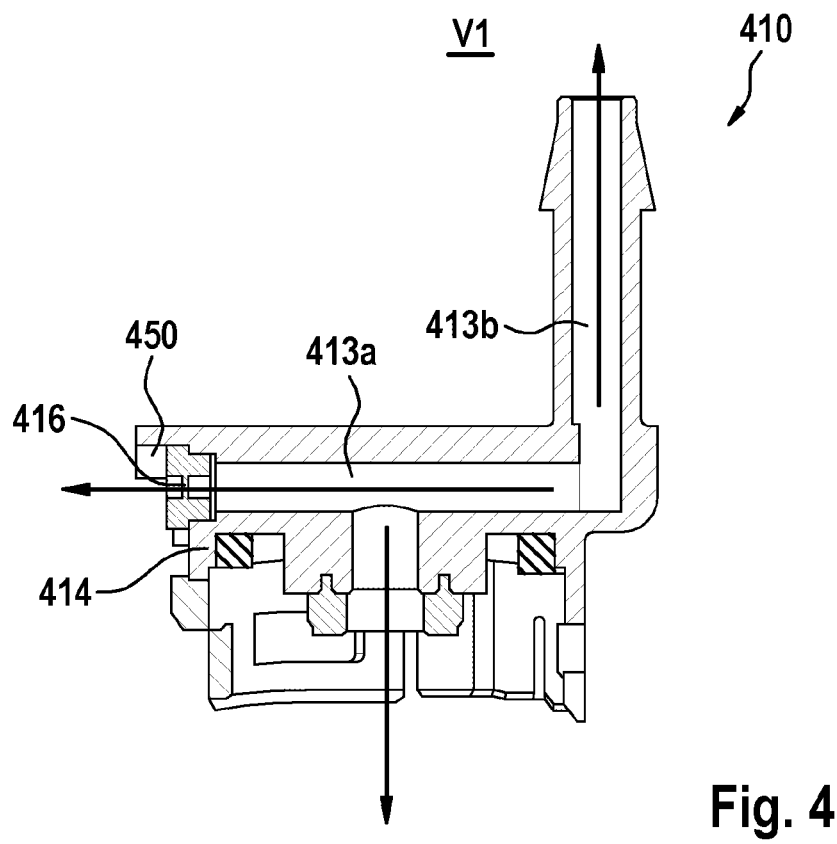
FIG. 4 shows a side view of a section through a housing cover of a detection device according to the invention.

FIG. 4 shows a side view of a section through a housing cover 410 of a detection device 100 according to the invention. The housing cover 410 forms an inlet duct 413 which has a first section 413*a* and a second section 413*b*. The two sections 413*a*, 413*b* are arranged at an angle different from zero, here at an angle of 90°, to each other. As a result, the inlet duct 413 can no longer be completely demolded by means of a single demolding tool. For this purpose, the inlet duct 413 is now demolded by means of two demolding tools. The moving-out directions of the demolding tools are specified by the arrows. As a result, the compensation opening 414 turns out to be significantly larger than is necessary or beneficial for the compensation process. Therefore, the compensation opening 414 in this embodiment is closed by means of a closure element 450 in which the compensation element 416 is arranged. As a result, by means of a simple procedure the opening which is necessary for the demolding in the first section 413*a* of the inlet duct 413 is closed, and at the same time the compensation element 414 which is necessary for reliable functioning of the detection device 100, with a defined compensation rate, is provided.

Figure 5:
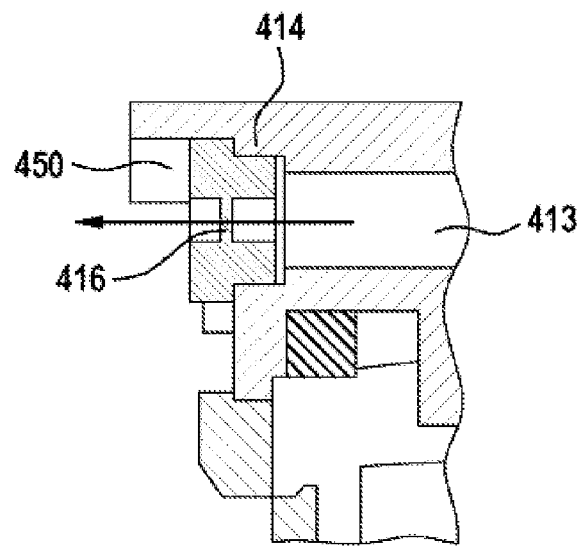
FIG. 5 shows a view of a detail of a side view of a section through a housing cover of a detection device according to the invention.

FIG. 5 shows a view of a detail of a side view of a section through a housing cover 410 of a detection device 100 according to the invention. The closure element 450 in which the compensation element 414 is arranged, in order to close the compensation opening 416 in the inlet duct is pressed in or welded in, in particular by means of ultrasonic welding or laser welding, or bonded in. For this purpose, the cross-sectional area or the diameter of the end section of the first section 413*a* of the inlet duct 413 can be configured to be larger in the region of the compensation opening 416 than the cross-sectional area or the diameter of the inlet duct 413 or of the first section 413*a* of the inlet duct 413.

Figure 6:
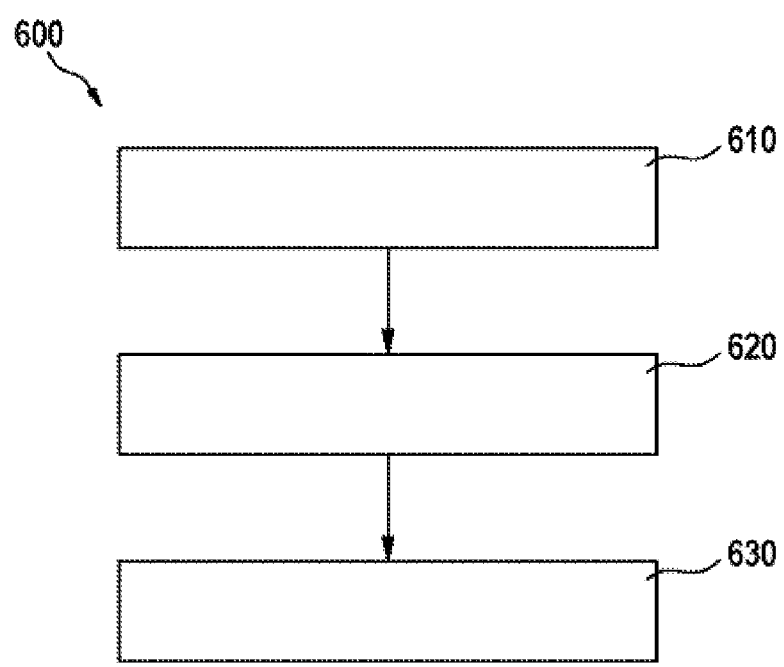
FIG. 6 shows a flowchart of a production method according to the invention.

FIG. 6 shows a flowchart of a production method 600 according to the invention for a detection device 100. In this context, in a step 610 the housing cover 410 is formed, as a one-piece molded part, with an inlet duct 413 which has a first section 413*a* and a second section 413*b* which are arranged at an angle different from zero, in particular at an angle of 90°, to each other. In a step 620, the first section 413*a* of the inlet duct 413 is closed with a closure element 450. In a step 630, a detection sensor 130 is arranged in a housing 120, and the housing cover 410 is attached to the housing 120 by means of sealing elements 142, 144 and holding elements 122, with the result that the detection sensor 130 makes contact with the plug contact-forming means 126.

The exemplary embodiments which are described and shown in the figures are selected only by way of example. Different exemplary embodiments can be combined with one another completely or with respect to individual features. An exemplary embodiment can also be replaced by features of a further exemplary embodiment. In addition, inventive method steps can be repeated and implemented in a sequence other than that described.

What is claimed is:

1. A method (600) for producing a detection device (100) for detecting a property of a medium, the method comprising
providing a housing (120), a detection sensor (130) arranged in the housing (120), and a compensation element (116, 416);
molding a housing cover (110, 410) as a one-piece part, wherein the compensation element (116, 416) is arranged on or in the housing cover (110, 410), and wherein the housing cover (110, 410) forms at least one inlet duct (113, 413) with an inlet port (112) for the medium;
forming a first section of the inlet duct (413*a*) and a second section of the inlet duct (413*b*) as part of the one-piece molded part (110, 410) such that the first section (413*a*) and the second section (413*b*) are arranged at an angle different from zero to each other, wherein the first section of the inlet duct (413*a*) is formed by means of a single demolding tool removed from the one-piece molded part (110, 410), wherein the first section of the inlet duct (413*a*) has a compensation opening (114, 414), and wherein the cross-sectional area of the first section (413*a*) is formed so as to be constant or so as to widen in the longitudinal extent of the first section (413a) in the direction of the compensation opening (114, 414); and closing the first section (413a) with a closure means (450).

2. The method (600) as claimed in claim 1, wherein
the medium is a fluid,
the first section of the inlet duct (413a) communicates with a first volume (V1),
the second section of the inlet duct (413b) communicates with a second volume (V2), and
the compensation element (116, 416) compensates the properties, to be measured, of the fluid in the first volume (V1) and the corresponding properties of the fluid in the second volume (V2).

3. The method (600) as claimed in claim 2, characterized in that the property, to be measured, of the fluid is at least one of the following: a pressure; a change in pressure; a volume; a change in volume; a temperature; a change in temperature; a mass and a change in mass of the fluid.

4. The method (600) as claimed in claim 2, characterized in that the compensation element (116, 416) is a pressure compensation element and causes the distribution of the fluid in the first volume (V1) and in the second volume (V2) to be essentially the same.

5. The method (600) as claimed in claim 2, wherein the medium is a gas.

6. The method (600) as claimed in claim 1, characterized in that the closure means is a closure element (450), and in that the compensation element (116, 416) is arranged in or on the closure element (450).

7. The method (600) as claimed in claim 6, characterized in that in order to close the compensation opening (116, 416) of the first section (413a), the closure element (450) is pressed in, welded in, or bonded in.

8. The method (600) as claimed in claim 7, wherein
the medium is a fluid,
the first section of the inlet duct (413a) communicates essentially with a first volume (V1),
the second section of the inlet duct (413b) communicates essentially with a second volume (V2), and
the compensation element (116, 416) essentially compensates the properties, to be measured, of the fluid in the first volume (V1) and the corresponding properties of the fluid in the second volume (V2).

9. The method (600) as claimed in claim 8, characterized in that the property, to be measured, of the fluid is at least one of the following: a pressure; a change in pressure; a volume; a change in volume; a temperature; a change in temperature; a mass and a change in mass of the fluid.

10. The method (600) as claimed in claim 9, characterized in that the compensation element (116, 416) is a pressure compensation element and causes the distribution of the fluid in the first volume (V1) and in the second volume (V2) to be essentially the same.

11. The method (600) as claimed in claim 6, characterized in that in order to close the compensation opening (116, 416) of the first section (413a), the closure element (450) is pressed in, welded in by means of ultrasonic welding or laser welding, or bonded in.

12. The method (600) as claimed in claim 6, wherein
the medium is a fluid,
the first section of the inlet duct (413a) communicates essentially with a first volume (V1),
the second section of the inlet duct (413b) communicates essentially with a second volume (V2), and
the compensation element (116, 416) essentially compensates the properties, to be measured, of the fluid in the first volume (V1) and the corresponding properties of the fluid in the second volume (V2).

13. The method (600) as claimed in claim 12, characterized in that the property, to be measured, of the fluid is at least one of the following: a pressure; a change in pressure; a volume; a change in volume; a temperature; a change in temperature; a mass and a change in mass of the fluid.

14. The method (600) as claimed in claim 13, characterized in that the compensation element (116, 416) is a pressure compensation element and causes the distribution of the fluid in the first volume (V1) and in the second volume (V2) to be essentially the same.

* * * * *